(12) United States Patent
Tea

(10) Patent No.: US 9,934,552 B2
(45) Date of Patent: Apr. 3, 2018

(54) METHOD AND SYSTEM FOR SUPPLYING VISUALLY ENCODED IMAGE DATA

(71) Applicant: GIESECKE & DEVRIENT GMBH, Munich (DE)

(72) Inventor: Vui Huang Tea, Stockholm (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 193 days.

(21) Appl. No.: 14/888,507

(22) PCT Filed: Apr. 30, 2014

(86) PCT No.: PCT/EP2014/001159
§ 371 (c)(1),
(2) Date: Nov. 2, 2015

(87) PCT Pub. No.: WO2014/177277
PCT Pub. Date: Nov. 6, 2014

(65) Prior Publication Data
US 2016/0078597 A1 Mar. 17, 2016

(30) Foreign Application Priority Data
May 2, 2013 (EP) .................................... 13002341

(51) Int. Cl.
*G09G 5/00* (2006.01)
*G06T 3/40* (2006.01)
(Continued)

(52) U.S. Cl.
CPC .......... *G06T 3/40* (2013.01); *G06K 19/06028* (2013.01); *G09C 5/00* (2013.01)

(58) Field of Classification Search
CPC ................ G06K 19/06028; G06T 3/40; G06T 3/4007–3/4092
See application file for complete search history.

(56) References Cited

U.S. PATENT DOCUMENTS 6,513,721 B1 * 2/2003 Salmre ...................... G06F 8/34
235/381
7,596,645 B1 9/2009 Hillebrand
(Continued)

FOREIGN PATENT DOCUMENTS

WO 2001008097 A1 2/2001
WO 2001059706 A1 8/2001
WO 2006064171 A1 6/2006

OTHER PUBLICATIONS

"Creating Quality Bar Codes for Your Mobile Application," Motorola White Paper, Dec. 2010, pp. 1-12.
(Continued)

*Primary Examiner* — Charles Tseng
(74) *Attorney, Agent, or Firm* — Workman Nydegger

(57) ABSTRACT

A method for supplying visually encoded image data for displaying through a mobile end device includes supplying a datum. A device type of the end device is ascertained on the basis of a user identity which is assigned to a security element integrated into the end device. On the basis of the device type of the end device, the device properties of the end device are ascertained which influence a displaying of visually encoded image data on the end device. On the basis of the ascertained device properties, an image data representation information item is generated for generating visually encoded image data for the end device in device-specific fashion. Finally, the visually encoded image data are generated based on the image data representation information item in device-specific fashion for representing the datum on the end device.

15 Claims, 3 Drawing Sheets

(51) Int. Cl.
G09C 5/00 (2006.01)
G06K 19/06 (2006.01)

(56) References Cited

U.S. PATENT DOCUMENTS

| | | | | |
|---|---|---|---|---|
| 2001/0047517 | A1* | 11/2001 | Christopoulos | ........... G06T 1/00 |
| | | | | 725/87 |
| 2003/0058261 | A1 | 3/2003 | Challa et al. | |
| 2005/0279826 | A1* | 12/2005 | Merrien | ............... G06Q 20/341 |
| | | | | 235/380 |
| 2006/0009214 | A1* | 1/2006 | Cardina | ................ H04W 12/12 |
| | | | | 455/432.3 |
| 2010/0149187 | A1* | 6/2010 | Slavin | ..................... G06K 1/12 |
| | | | | 345/441 |

OTHER PUBLICATIONS

European Search Report for corresponding European Application No. EP13002341, dated Sep. 12, 2013.
International Search Report for corresponding International PCT Application No. PCT/EP2014/001159, dated Jun. 12, 2014.
Kato et al., "2D Barcodes for Mobile Phones," Mobile Technology, Applications and Systems, 2005 2nd International Conference on, Guangzhou, China, Nov. 15-17, 2005, pp. 1-8.

\* cited by examiner

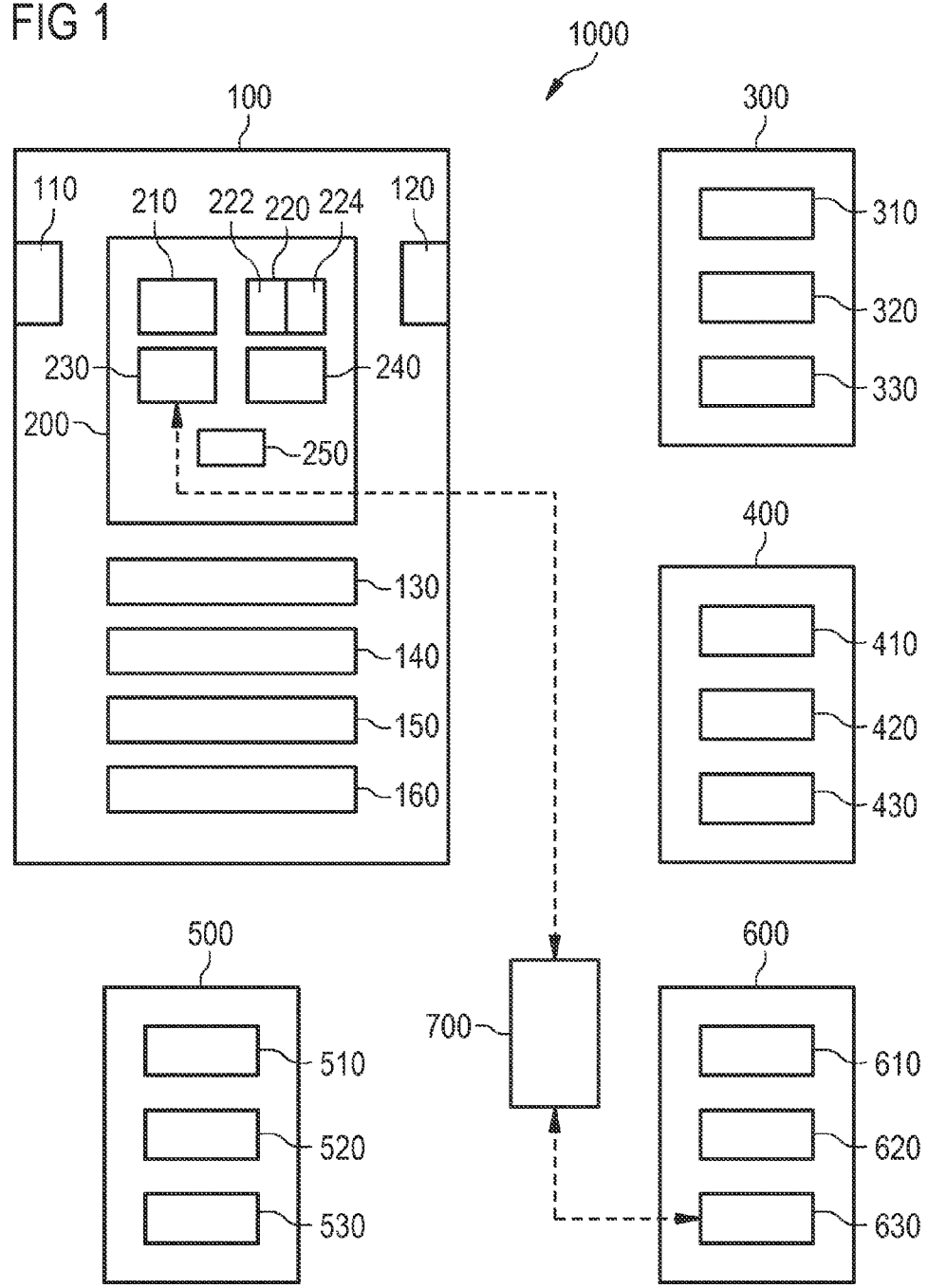

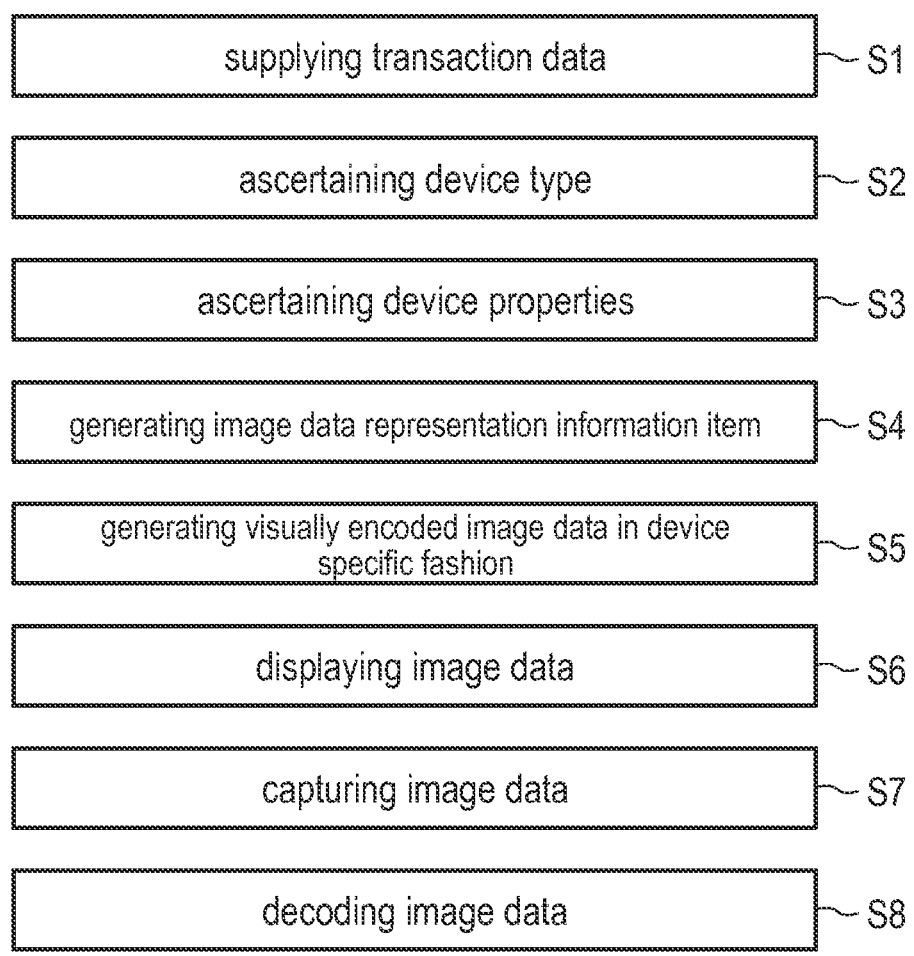

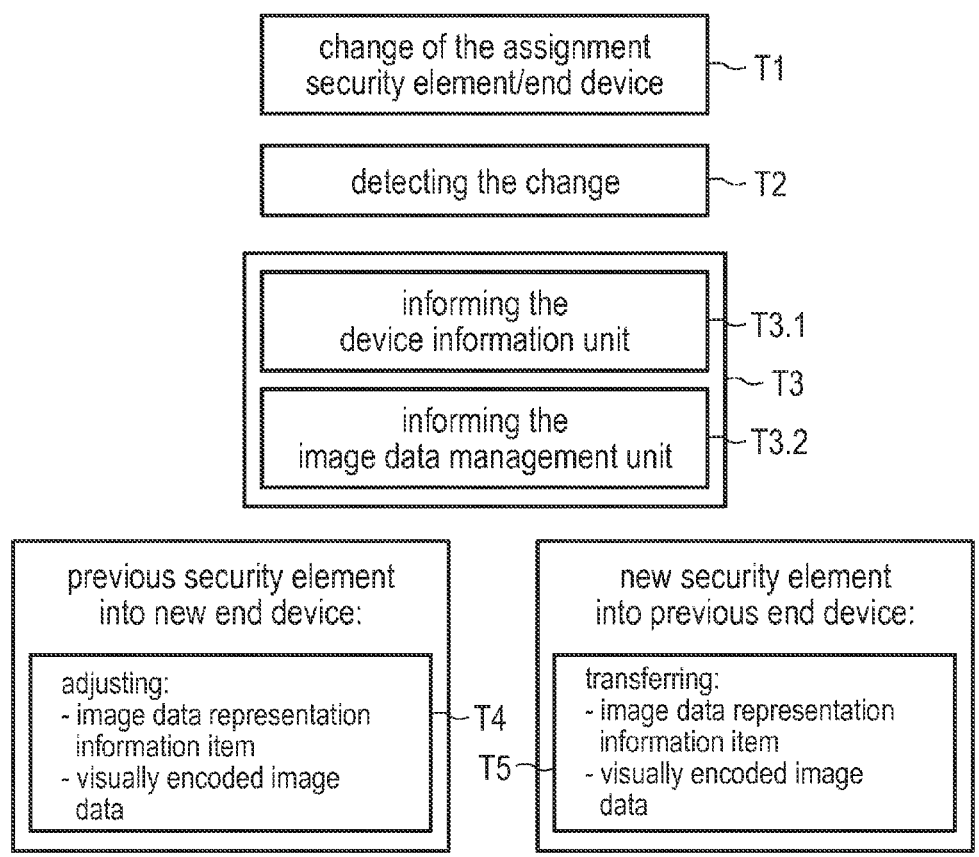

METHOD AND SYSTEM FOR SUPPLYING VISUALLY ENCODED IMAGE DATA

BACKGROUND

The present invention relates to a method for supplying visually encoded image data, preferably in the form of at least one bar code, for displaying through a mobile device, a security element of such an end device, an image data generation unit, an image data management unit, as well as a system comprising a device information unit, an image data generation unit and at least one mobile device.

Bar codes, in the form of 1D and 2D bar codes, have been traditionally affixed on printed matter and on physical objects to be read by appropriate bar code scanners. There are many types of bar codes, such as PDF417, microPDF417, MaxiCode, DataMatrix (standard, inverse), QR Code (standard, inverse and micro), Han Xin, Aztec (standard, inverse), etc. and variants. These codes generally work with the same imaging principle.

With increasing availability of mobile devices with autofocus cameras and bar code scanners, bar codes, in particular 2D bar codes, have started to gain a big role in mobile marketing. The subscribers use their mobile phone to read a bar code that will bring them to a website, display information, and send SMS, etc. The next stage of mobile bar code has started gaining traction, and that is to issue boarding passes, tickets, store cards, coupons, etc. to the mobile phones and to display these bar codes to be read by a cashier, movie counter, shops, etc. Although the same types of bar codes are used, new sets of unanticipated problems have emerged that have never been addressed in use prior cases with printed bar codes.

One of these problems is, for example, that bar codes, which were generated on the basis of identical starting data, sometimes may appear very different on different end devices. On an end device which comprises a comparatively large display with very high resolution a bar code may appear too small for being captured by a reading device, since the reading device does not support such a resolution. The same bar code may possibly be displayed only partially on an end device with small display and very low resolution, and therefore not be captured correctly by the reading device, either.

Problems also arise by a user changing his end device, for example replacing an old end device by a new end device. The representation parameters for the optimal generation and representation of a bar code were known for the old end device, but these parameters will normally no longer be usable for the new end device, as this has deviating device properties.

SUMMARY

It is the object of the present invention to propose a method and a system which make it possible for a user of a mobile (end) device to be supplied with visually encoded image data, in particular bar codes, respectively in a form which allows the image data to be displayed on the end device so as to be capturable through a reading device.

This object is achieved by a method, a security element, an image data generation unit, an image data management unit, as well as a system having the features of the independent claims. Advantageous embodiments and developments are stated in the dependent claims.

A method according to the invention for supplying visually encoded image data, preferably in the form of at least one bar code, for displaying through a mobile (end) device comprises the following steps: A datum to be represented through the visually encoded image data is supplied, preferably in the form of a transaction data set. The transaction data here may correspond for example to a ticket, in particular a transport ticket, a coupon, or the like. The transaction data set can comprise not only content data, for example the transport ticket, but also a securing data set, in particular a digital signature over the content data.

To make it possible for the visually encoded image data to be generated for the specific (end) device in device-specific, i.e. device-optimized, fashion, in a next step a device type of the end device is ascertained on the basis of a user identity which is assigned to a security element integrated into the end device.

In the next step, on the basis of the device type of the end device there are ascertained such device properties of the end device, which influence a displaying of visually encoded image data on the end device. Such device properties are, in particular, the size and/or the resolution of a display unit, in particular of a display, of the end device. Additional device properties can also relate to a software equipment of the end device and/or of the security element of the end device.

On the basis of the ascertained device properties there is generated an image data representation information item for generating visually encoded image data for the end device in device-specific fashion. The image data representation information preferably comprises values which are derivable from the values describing the device properties.

Finally, the visually encoded image data are generated, based on the image data representation information item, for representing the datum on the end device in device-specific fashion.

A system according to the invention comprises a device information unit, an image data generation unit, and at least one mobile end device.

The device information unit is adapted to ascertain a device type of a mobile end device on the basis of a user identity which is assigned to a security element integrated into the mobile end device. Furthermore, the device information unit is adapted to ascertain, on the basis of the ascertained device type, device properties of the end device which influence a displaying of visually encoded image data on the end device.

The image data generation unit is adapted to generate, for representing a predetermined datum, visually encoded image data in device-specific fashion according to an image data representation information item for displaying on the end device. The image data representation information here was generated on the basis of the ascertained device properties by the device information unit or the image data generation unit.

The mobile end device is adapted to display the visually encoded image data generated in device-specific fashion for this end device and representing the datum.

An image data generation unit according to the invention is characterized in that it is configured as an image data generation application which is executable on a mobile end device or on a security element integrated into a mobile end device. The image data generation application is adapted to access, for generating the visually encoded image data in device-specific fashion, an image data representation information item stored in the security element or to request this item.

The invention thus makes it possible to generate visually encoded image data for any arbitrary end device in device-specific or device-optimized fashion. A thus adjusted, optimized generation of the image data always allows a displaying of the image data on the end device, which is capturable by a reading device of a processing unit without problems. The entire process of the device-specific generation of the visually encoded image data remains transparent for a user of the end device.

The term "visually encoded image data" is to be interpreted broadly in the present case, but is to comprise, as already mentioned, in particular bar codes. This relates in particular to all common and known types of one- and two-dimensional bar codes. In the same way, the term "visually encoded image data" is to comprise, however, also other visually representable codes, such as for example dot codes, color codes, icons and the like.

As already described above, the steps of ascertaining the device type and of ascertaining the device properties are normally carried out through a device information unit. The device-specific generation of the visually encoded image data, on the other hand, is carried out through an image data generation unit different from the device information unit.

The generation of the image data representation information can be effected both through the device information unit and through the image data generation unit. The device properties and, where applicable, the image data representation information are transferred from the device information unit to the image data generation unit.

For ascertaining the device type, the device information unit preferably comprises an assigning unit. This is adapted to assign to a unique identifier of a security element, for example to an IMSI (international mobile subscriber identity), a unique identifier of the end device wherein the security element is integrated, for example an IMEI (international mobile station equipment identity). The assigning unit is further adapted to assign a device type to the unique identifier of the end device. For this purpose, the assigning unit preferably comprises one or several appropriate tables.

For ascertaining the device properties of the end device, the device information unit preferably comprises a device properties information unit. The latter unit is adapted to store device properties for different device types. Also the device properties information unit can be configured in the form of a suitable table.

Optionally, the device information unit can comprise a device and security element equipment information unit. The latter is adapted to store equipment information items, in particular on a software equipment of the end device and/or of the security element, for different devices and/or different security elements.

The image data generation unit of the system according to the invention can be supplied through an external image data generation unit. Such an image data generation unit is adapted to transfer the visually encoded image data generated in device-specific fashion to the end device or a security element of the end device. As already mentioned, the image data generation unit can also be configured, however, as an image data generation application according to the invention on the end device or the security element.

In accordance with a preferred embodiment of the method according to the invention, the data, normally the transaction data, which are represented by means of the visually encoded image data, are encrypted before the generation of the visually encoded image data. Such an encryption can be effected already at the service provider who supplies the data for the end device. An encryption can also take place, however, on the security element of the end device. For this purpose, the security element can comprise an encryption unit. The encryption is normally effected in session-specific fashion, i.e. in each encryption operation modified session keys or auxiliary data, which influence the encryption, are employed.

According to a further preferred embodiment of the method, the visually encoded image data are generated as image data in the GSM icon format. Such image data can then be stored as an icon file in the security element and displayed by means of known STK commands (SIM toolkit commands). This allows a displaying of the visually encoded image data also on devices which only have comparatively primitive graphics capabilities, i.e. a small display with a very low resolution. For end devices of higher quality there can be supplied visually encoded image data according to known graphics formats or video formats.

According to a further preferred embodiment, the visually encoded image data can be supplemented by a text information item, which can be displayed together with the visually encoded image data through the end device. Such a text information item can improve the user friendliness upon employment of the image data. This holds, for example, when the text data state how the image data are to be handled or which information is encoded by means of the image data. A display application of the end device is then adapted to display, in addition to the visually encoded image data, also the assigned text information. Preferably, the text information is displayed together with the image data.

An image data representation information item generated for a specific end device can be stored in a security element of the end device. In case the image data generation item is arranged on the end device or the security element itself, in future then the steps of ascertaining the device type and the device properties, as well as the step of generating the image data representation information item can be dispensed with. After having received the transaction data to be represented, the local image data generation application can directly resort to the stored image data representation information item or request this item, in order to generate in device-specific fashion the visually encoded image data representing the transaction data.

Also device-specific visually encoded image data generated for an end device can be stored in the security element of the end device, for example for a later, further use, if this is provided for the corresponding type of image data. A repeated generation of identical image data can then be completely omitted.

The optional steps of the method according to the invention, described hereinafter, allow visually encoded image data to be generated for an end device in device-specific or device-optimized fashion, even when there is an alteration in the assignment of the end device to the security element integrated into the end device, i.e. in cases in which a security element is integrated into a new end device or in cases in which into an employed end device a new security element is inserted.

In both cases it is provided that the mentioned device information unit and/or an image data management unit to be described hereinafter are informed on this change of the assignment between security element and end device. Both units can be informed by means of a suitable message in a suitable format. This message preferably comprises at least the respective identifiers of security element and end device before and after the change of the assignment.

An image data management unit according to the invention comprises an image data and image data representation information management unit. The latter unit is adapted to manage, for at least one security element integratable or integrated into a mobile end device, information on visually encoded image data stored in the security element and/or on an image data representation information item stored in the security element. In other words, the image data management unit is adapted to support a change of the assignment between security element and end device.

The functionality for detecting the change of the assignment between security element and end device can be supplied through the security element, through the end device, or through an external unit which is located in a data communication network in which the end device with the security element operates. Normally, the entity which detects the change of the assignment, also assumes the functionality of informing the device information unit and/or the image data management unit.

A security element according to the invention is suitable to be temporarily or permanently integrated into a mobile end device. The security element comprises an end device ascertaining unit which is adapted to ascertain into which end device the security element is integrated in operation. The security element further comprises an image data representation information item which makes it possible for visually encoded image data to be generated for the relevant end device, into which the security element is currently integrated, in device-specific fashion for displaying through the end device.

A mobile end device of the system according to the invention can comprise a security element ascertaining unit which is adapted to ascertain, upon the operation of the end device, which security element is currently integrated into the end device.

In other words, both the security element according to the invention and the end device configured as described above are adapted to detect a change of the assignment between security element and end device.

In case the security element is integrated into a new end device, the image data representation information item stored in the security element and/or the visually encoded image data stored in the security element are adjusted to the device properties of the new mobile end device. For this purpose, the image data management unit can comprise a corresponding adjusting unit. In order to carry out such an adjustment, the adjusting unit of the image data management unit can cooperate preferably with the already described device information unit and, where applicable, the image data generation unit.

In case a new security element is integrated into the end device, the image data representation information item stored in the previous, now replaced security element and/or the visually encoded image data stored in the previous security element are transferred to the new security element. For reading out these data from the previous security element and/or for writing to the new security element, security queries can be provided, for example the input of a password or the like. The transfer of data from the previous security element into the new security element is supported on the part of the image data management unit through an accordingly adapted transfer unit.

The image data management unit according to the invention can be a part of the system according to the invention.

Finally, the system according to the invention can comprise a processing unit. This in turn comprises a reading device and a decoding unit. The reading device is adapted to capture visually encoded image data displayed through the mobile end device. The decoding unit is adapted to decode the captured visually encoded image data to the datum represented by means of the image data. Optionally, the processing unit can comprise an decryption unit for the decryption of, where applicable, encrypted transaction data.

The coordination of associated encryption or decryption keys at a service provider or the security element, where the encryption takes place, or at the decryption unit of the processing unit, which carries out the decryption, can be effected by a background system. The background system can likewise be part of the system according to the invention.

BRIEF DESCRIPTION OF THE DRAWINGS

The present invention will hereinafter be described by way of example with reference to the attached drawings. Therein are shown:

FIG. 1 components of a preferred embodiment of a system according to the invention;

FIG. 2 steps of a preferred embodiment of a method according to the invention, and FIG. 3 supplementing steps of the method of FIG. 2.

DETAILED DESCRIPTION OF VARIOUS EMBODIMENTS

The system 1000 comprises a mobile end device 100 having a security element 200, an external image data generation unit 300, a device information unit 400, an image data management unit 500, as well as a processing unit 600 and a background system 700.

The mobile end device 100 can be configured for example as a smart phone, tablet computer, mobile radio end device, notebook, wearable device (smart watch, smart glasses, . . . ) or the like.

The mobile end device 100 comprises a network interface 110 for communication via a data communication network, for example a mobile radio network or the Internet. Furthermore, the end device 100 comprises a communication interface 120 for contactless near-field data communication, for example in the form of an NFC interface.

An image data generation unit 140 serves to generate, based on a datum to be represented, visually encoded image data according to an image data representation information item and according to a predetermined encoding method, in particular in the form of two-dimensional bar codes. These image data can then be displayed via a display unit 160 of the end device 100, for example a display, for the optical capturing through a suitable reading device 610 of the processing unit 600.

The security element ascertaining unit 130 is adapted to identify a security element 200 integrated into the end device 100 and to detect a change of the security element 200.

The end device 100 can further comprise a device-side portion 150 of a so-called wallet application. The wallet application here comprises the portion 150 which is executed on the end device 100 and serves as an interface and integration point for various portions installed on the security element 200, such as for example the portion 250. These portions of the wallet application, which are arranged on the side of the security element 200, can comprise for example payment applications, ticket applications, or the like. The portion 250 on the security element 200 can be adapted, for example, to generate transaction data and/or to receive them via a secured data transfer channel, for example from an assigned service provider.

The security element 200 comprises an end device ascertaining unit 210, a memory region 220 for storing visually encoded image data 222, as well as an image data representation information item 224. The security element 200 further comprises an encryption unit 230, an image data generation application 240, as well as the above-mentioned security-element-side portion of the wallet application 250.

The security element 200 can be provided as a security element temporarily integratable into the end device 100 or firmly installed therein. Removably integratable security elements are for example SIM/UICC mobile radio cards, secure multimedia cards, or the like. As security elements 200 firmly installed in the end device 100 there can serve for example embedded SIM/UICC mobile radio cards, TPMs ("trusted platform modules") or NFC modules. Finally, also secure execution environments within a specific hardware architecture of the end device 100, for example within an ARM TrustZone architecture, can serve as security elements 200, such as for example a "trusted execution environment" according to the "Global Platform" specification.

The end device ascertaining unit 210 is adapted to detect into which end device 100 the security element 200 is integrated in operation. In particular, the end device ascertaining unit 210 is adapted to detect when the security element 200 is integrated into a new end device 100. For this purpose, the end device ascertaining unit 210 can have for example a memory region in which an identifier of the end device 100 is stored. With each new start of the security element 200 the end device ascertaining unit 210 checks whether the stored identifier matches the identifier of the current end device 100. If this is not the case, a change of the end device 100 is present. The end device ascertaining unit 210 is adapted to report such a change of the assignment between security element 200 and end device 100 to the device information unit 400 to be described hereinafter, as well as to the image data management unit 500. This can be done for example by SMS. It is evident, that also the security element ascertaining unit 130 of the end device 100 can transfer analogous information to the corresponding units.

The encryption unit 230 of the security element 200 is adapted to encrypt, if necessary, a datum to be represented by means of visually encoded image data, for example a transaction data set or parts thereof. The encryption is normally carried out in session-specific fashion. For this purpose, the security element 200 can be adapted to dynamically generate and store session keys.

The image data generation unit 240 is adapted to generate, based on a data set to be represented as well as based on the image data representation information 224, visually encoded image data, in particular bar codes according to different bar code formats, for the end device 100 in device-specific fashion. In the present example, the image data generation unit 240 is depicted as an image data generation application executable on the security element 200.

An analogous functionality for image data generation can be supplied in the same way, as mentioned above, through an image data generation application 140 on the end device 100.

Alternatively or additionally, for generating device-specific visually encoded image data there can also be made use of the services of an external image data generation unit 400, for example of an image data generation server 300.

The device information unit 400, which is present as a server unit, comprises an assigning unit 410, a device properties information unit 420, as well as a device and security element equipment information unit 430.

The assigning unit 410 is adapted to assign to a unique identifier of a security element 200 respectively a unique identifier of the end device 100 wherein the security element 200 is integrated. Preferably, this is done in the form of a table. In case of a change of the assignment between security element 200 and end device 100, the table is accordingly updated, as this is to be described hereinafter with reference to FIG. 3. As an identifier for a security element 200 there can serve an IMSI, as an identifier for the end device 100 an IMEI.

The assigning unit 410 is further adapted to assign a device type to the unique identifier of the end device 100. Here, too, tables are normally used.

The device properties information unit 420 stores device properties for different device types. This concerns in particular such device properties of mobile end devices 100 which are decisive for displaying of visually encoded image data on the end device 100. Such properties are in particular the size of a display unit 160, i.e. of a display, of the end device 100 as well as the resolution of such a display unit.

The device and security element equipment information unit 430 can optionally comprise further equipment information items for different end devices 100 and/or security elements 200. Such information can relate, for example, to a software equipment of the end devices or security elements, for example whether an end device or a security element has its own image data generation application, and if yes, which type of visually encoded image data can be generated by means of this image data generation application.

The image data generation server 300 comprises an encoding unit 310, a text data unit 320, as well as a sequence unit 330.

The encoding unit 310 is adapted to generate, based on a received data set, visually encoded image data according to a predetermined encoding format for representing said data set. Here, normally, at least all the known one- and two-dimensional bar code formats are supported. The encoding unit 310 is additionally adapted to take up an image data representation information item 224. This image data representation information item 224 indicates the way in which visually encoded image data are to be generated for a specific end device 100. The image data representation information item 224 here was generated on the basis of device properties ascertained for the device type of the end device, for example through the device information server 400.

Alternatively or additionally, the image data representation information item 224 can be created on the part of the image data generation unit 300 itself, based on received device properties for an end device 100.

The device properties relate, as mentioned above, substantially to the size and the resolution of the display 160 of the end device 100. The image data representation information item 224 normally comprises values derived from the above-mentioned parameters, such as for example the number of diagonal elements on the display 160, the size of such an element, as well as scaling values derived from the above-mentioned values, for generating different visually encoded image data, in particular bar codes of common formats.

By means of the text data unit 320 arbitrary text information can be added to visually encoded image data.

The sequence unit 330 is adapted to divide a datum to be represented into data blocks of predetermined sizes, then for each block an image datum of the given format, for example a bar code, being generated by means of the encoding unit 310. In this way, it is possible to generate also larger data sets as a sequence of mutually connected visually encoded image data. For displaying this sequence, the bar codes are normally displayed successively on the end device 100.

The above-mentioned image data generation applications 140, 240 on the end device 100 or the security element 200 comprise in principle the same functionalities as the image data generation server 300.

The image data management unit 500 is supplied as an image data management server and is adapted to manage, for at least one mobile end device 100 and a security element 200 integratable therein, information on the visually encoded image data 222 stored in the security element 200 as well as, where applicable, on the image data representation information item 224 stored in the security element 200.

The device management unit 510 stores for a security element 200 information on the end device 100 into which the security element 200 is currently integrated, in particular a unique identifier of the end device 100.

The adjusting unit 520 is adapted to adjust, when a security element 200 is integrated into a new end device 100, the image data representation information item 224 stored in the security element 200 as well as, where applicable, the visually encoded image data 222 stored in the security element 200 to the device properties of the new mobile end device. Corresponding steps will be described hereinafter with reference to FIG. 3.

The transfer unit 530 is adapted to transfer, when a new security element is integrated into an end device 100, the image data representation information item 224 stored in the previous security element 200 as well as the visually encoded image data 222 stored in the previous security element 200 to the new security element now integrated into the end device 100.

The processing unit 600 comprises a reading device 610, a decoding unit 620, and optionally a decryption unit 630. The reading device 610, which can be configured for example as a mobile hand-held device, is adapted to optically capture visually encoded image data represented via the display unit 160 of the end device 100, for example by means of a camera unit or scanner unit.

The decoding unit 620 is adapted to decode the visually encoded image data. The decryption unit 630, finally, is adapted to decrypt the decoded image data, if these are present in encrypted form.

A further processing of the decoded and, where applicable, decrypted data can be effected in the processing unit 600 or in a further device (not shown) connected with the processing unit 600.

The system 1000 can comprise a background system 700, if an encryption of transaction data, for example through the security element 200, is provided.

This background system 700 can be adapted to coordinate the encryption and decryption of the transmitted data between the security element 200 and the decryption unit 630 of the processing unit 600. In other words, the background system 700 is adapted to equip the security element 200 and the processing unit 600 with the encryption keys and decryption keys, current pseudo-random data or the like that are to be respectively used. Alternatively, the background system 700 can supply the security element 200 and the processing unit 600 with methods and rules for the synchronous generation of such keys and/or further auxiliary data. Activating and updating the security element 200 and decryption unit 630 is normally effected in secured fashion via an over-the-air interface (OTA) through the background system 700.

With reference to FIG. 2, in the following there will be described by way of example steps of a preferred embodiment of a method for supplying visually encoded image data for displaying through a mobile end device.

The image data here can serve to represent a transaction data set. Such transaction data may correspond for example to a mobile transport ticket, a mobile ticket, a coupon, or the like. The transaction data set can be generated by a service provider. Alternatively, a generation on the security element 200 of the end device 100, for example by means of the application 250, is possible.

In the presently illustrated example, this transaction data set is to be supplied by a service provider, such as depicted with respect to step S1.

In a subsequent step not shown, there is transferred on the part of the service provider to the image data generation server 300, together with the datum to be represented, a unique identifier of the security element 200 to which the visually encoded image data to be generated, which then represent the transaction data, are to be transferred. There, preparatory steps are initiated which in the following allow a device-specific generation of the visually encoded image data through the image data generation server 300.

For the device-specific generation of the visually encoded image data, the image data generation server 300 needs a corresponding image data representation information item 224 for the end device 100 which is assigned to the security element 200. So as to obtain this information, the image data generation server 300 transfers the identifier of the security element 200 to the device information server 400.

In step S2, the assigning unit 410 of the device information server 400 ascertains the device type of the end device 100 for which the visually encoded image data are to be generated, on the basis of the received user identity of the security element 200. For this purpose, the above-described table is accessed.

With the help of the tables, in step S3, there are further ascertained, based on the ascertained device type, device properties of the end device 100. This step, too, is normally carried out on the part of the device information server 400.

Finally, in step S4, on the basis of the device properties there is generated an image data representation information item 224, preferably likewise through the device information server 400. This image data representation information item 224 comprises the already mentioned technical parameters that are necessary for generating, for example, a bar code for the end device 100 in display-optimized fashion. Step S4 can optionally also be carried out in the image data generation unit 300 or in one of the image data generation applications 240, 140.

In order to generate the visually encoded image data, as stated in step S5, the datum to be represented is transmitted together with the image data representation information to the image data generation server 300.

According to an alternative embodiment, when it is, for example, known that the security element 200 or the assigned end device 100 comprises its own image data generation application 140, 240, the datum to be represented can be transferred directly to the security element 200. As mentioned above, it can also be provided that transaction data to be represented are generated in the security element itself, for example through the portion 250 of the wallet application. If the security element 200 stores an image data representation information item 224, the steps S2 to S4 can be omitted. If not, the security element 200 transfers the identifier for ascertaining the end device 100 to the device information server 400, as described above. The steps S2 to S4 are then carried out in the way described herein. The image data representation information item generated in step S4 is then transferred on the part of the device information server 400 to the security element 200. There, or on the end device 100, a generation of the visually encoded image data (step S5) can then take place.

In step S6, the end device 100 displays the visually encoded image data generated by itself or received from the security element 200 or the image data generation server 300.

For processing the image data through the processing unit 600, in step S7, the displayed visually encoded image data are captured through the reading device 610. In step S8, the captured data are decoded through the decoding unit 620 and then suitably processed further in the processing unit 600 or a connected unit.

With reference to FIG. 3, supplementing steps of the method will be subsequently described. These steps relate to a change of the assignment of security element 200 to end device 100.

Such a change of the assignment, which is stated in step T1, can be detected by different entities, as stated with reference to step T2.

On the one hand, the functionality of detecting the change of the assignment can be provided in the security element 200, namely in the form of the above-described end device ascertaining unit 210. An analogous functionality can be supplied by the security element ascertaining unit 130 of the end device 100. Finally, an external unit, which is arranged in a network via which the end device 100 with the security element 200 communicate, can detect a change of the assignment between security element 200 and end device 100 through analysis of corresponding data packets of a data communication.

If a change of the assignment is detected, the device information server 400 and the image data management server 500 are informed, as stated in step T3. A corresponding information message comprises, for example, respectively the identifiers of end device 100 and security element 200 in the old configuration as well as in the altered, new configuration.

Based on this information message the device information server 400 as well as the image data management server 500 update their relevant data stocks, in particular the assigning unit 410 as well as the device information unit 510.

In case a security element 200 is integrated into a new end device, this requires, as stated with reference to step T4, an adjustment of the data stored in the security element 200, which data were device-specific to the previous end device 100. These are the image data representation information item 224 as well as the stored visually encoded image data 222.

An adjustment of these data can be effected with the help of the device information server 400 in the way described above, i.e. as stated in the steps S2 to S5, where applicable, with further assistance of the image data generation server 300. There is also the possibility that the two end devices concerned have substantially the same device properties, so that an alteration of the data, in particular of the stored bar codes, is not necessary.

In case into an end device 100, which is already in use, a new security element is integrated, it is necessary, as stated with reference to step T5, that data stored in the previous security element 200, i.e. the image data representation information item 224 as well as stored visually encoded image data 222, are transferred to the new security element. Since the device properties of the end device 100 have not changed, the above-mentioned data can be transferred in unchanged fashion.

The invention claimed is:

1. A method for supplying visually encoded image data, preferably in the form of at least one bar code, for displaying through a mobile device, comprising the steps of:
   supplying a datum to be represented through the visually encoded image data;
   ascertaining a device type of the mobile device on the basis of a user identity which is assigned to a security element integrated into the mobile device;
   ascertaining device properties of the mobile device, which influence a displaying of visually encoded image data on the mobile device, on the basis of the ascertained device type of the mobile device;
   generating an image data representation information item on the basis of the ascertained device properties for generating the visually encoded image data for the mobile device in device-specific fashion;
   generating the visually encoded image data in device-specific fashion according to the image data representation information item for representing the datum on the mobile device;
   wherein the steps of ascertaining the device type of the mobile device, ascertaining the device properties of the mobile device, and generating the image data representation information item are performed on the security element integrated into the mobile device.

2. The method according to claim 1, wherein the steps of ascertaining the device type and of ascertaining the device properties are carried out through a device information unit and that the step of generating the visually encoded image data in device-specific fashion is carried out through an image data generation unit different from the device information unit.

3. The method according to claim 1, wherein the visually encoded image data are generated as image data in a Global System for Mobile icon format.

4. The method according to claim 1, wherein generated visually encoded image data are supplemented by a text information item displayable through the mobile device.

5. The method according to claim 1, wherein the image data representation information item and/or visually encoded image data generated in device-specific fashion are stored in the security element of the mobile device.

6. The method according to claim 1, wherein, when the security element is integrated into a new mobile device or when a new security element is integrated into the mobile device, a device information unit and/or an image data management unit is informed on this change of the assignment between security element and device.

7. The method according to claim 6, wherein the functionality for detecting a change of the assignment between security element and device as well as, where applicable, of informing the device information unit and/or the image data management unit on the change of this assignment is supplied through the security element or through the mobile device or through an external unit.

8. The method according to claim 1, wherein when the security element is integrated into a new mobile device, an image data representation information item stored in the security element and/or visually encoded image data stored in the security element are adjusted to the device properties of the new mobile device.

9. The method according to claim 1, wherein when a new security element is integrated into the mobile device, an image data representation information item stored in the previous security element and/or visually encoded image data stored in the previous security element are transferred to the new security element.

10. A security element suitable for temporary or permanent integration into a mobile device, comprising an end device ascertaining unit which is adapted to ascertain into which end device the security element is integrated, an image data generation unit which is adapted to generate visually encoded data, as well as an image data representation information item stored in the security element, wherein the visually encoded image data is generated within the security element for the end device in device-specific fashion for displaying through the end device.

11. An image data generation unit adapted to generate, based on a datum to be represented and on an image data representation information item, visually encoded image data in device-specific fashion, wherein the image data generation unit is provided on a security element integrated into a mobile device and is adapted to access an image data representation information item stored in the security element or to request the image data representation information.

12. An image data management unit comprising an image data, an image data representation information management unit, and an adjusting unit,
   wherein the image data representation management unit is adapted to manage, for at least one security element integratable or integrated into a mobile end device, information on visually encoded image data stored in the security element and/or on an image data representation information item stored in the security element; and
   the adjusting unit is adapted to adjust, when a security element is integrated into a new mobile end device, an image data representation information item stored in the security element and/or visually encoded image data stored in the security element to the device properties of the new mobile end device;
   wherein the image data management unit is provided on the security element.

13. The image data management unit according to claim 12, wherein a transfer unit which is adapted to transfer, when into an device a new security element is integrated, an image data representation information item stored in the previous security element and/or visually encoded image data stored in the previous security element to the new security element.

14. A system comprising
   a device information unit which is adapted to ascertain a device type of a mobile device on the basis of a user identity which is assigned to a security element integrated into the mobile device, and is adapted to ascertain device properties of the mobile device, which influence a displaying of visually encoded image data on the mobile device, on the basis of the ascertained device type of the mobile device;
   an image data generation unit which is adapted to generate visually encoded image data in device-specific fashion according to an image data representation information item for representing a datum on the mobile device, the image data representation information being generated on the basis of the ascertained device properties by the device information unit or the image data generation unit; and
   at least one mobile device which is adapted to display the visually encoded image data generated in device-specific fashion and representing the datum;
wherein the device information unit and the image data generation unit are provided on a security element of the at least one mobile device.

15. The system according to claim 14, wherein the device information unit comprises
   an assigning unit which is adapted to assign to a unique identifier of the security element a unique identifier of the mobile device, into which the security element is integrated, and preferably is adapted to assign a device type to the unique identifier of the mobile device,
   a device properties information unit which is adapted to store device properties for different device types, and
   a device and security element equipment information unit which is adapted to store equipment information items for different devices and/or different security elements.

* * * * *